April 21, 1959 R. W. ANDREASSON 2,882,765
DRILLS
Filed March 27, 1956
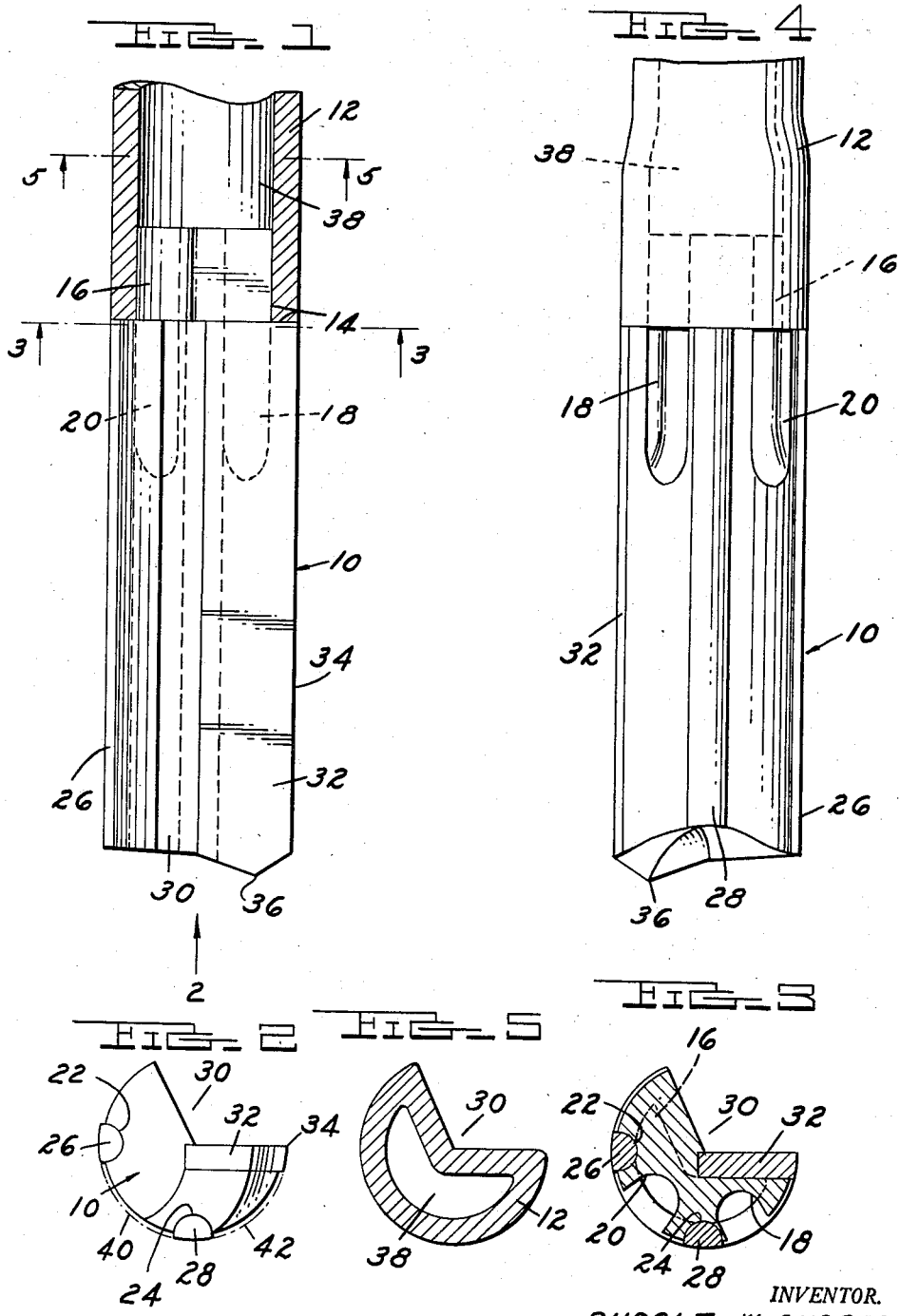
INVENTOR.
RUDOLF W. ANDREASSON
BY
Barnes, Kisselle, Laughlin & Raisch
ATTORNEYS

United States Patent Office 2,882,765
Patented Apr. 21, 1959

2,882,765

DRILLS

Rudolf W. Andreasson, Birmingham, Mich.

Application March 27, 1956, Serial No. 574,258

5 Claims. (Cl. 77—68)

This invention relates to drills and is particularly concerned with the construction of a deep hole drill sometimes called a "gun drill."

The problems in connection with this type of drill are accurate centering and the transmission of coolant to the cutting edges of the drill while removing the chips which are formed by the drilling action. It has been also a problem with deep hole drills of this type to furnish an adequate supply of coolant due to the restricted passages. Extremely high pressure and refrigerated coolants have been required together with special pumps. Also, there has been difficulty with center feed drills of forcing chips in between the drill and the wall of the hole, causing scoring and galling.

The present invention contemplates a drill in which the coolant is supplied through the inside of the drill shank to one or more surface openings in the drill head spaced from the cutting end of the drill at the outside, and the return path for the liquid is through a segmental groove extending completely along the length of the drill assembly.

The invention also contemplates a drill with the openings positioned to supply fluid under pressure to counteract the cutting force or cutting re-action of the drill and to provide a film bearing between the walls of the drill and the hole.

Other objects and features of the invention will be apparent in the following description and claims.

Drawings accompany the disclosure, and the various views thereof may be briefly described as:

Figure 1, an elevation of the drill showing the drill bit assembled to the shank.

Figure 2, an elevation end view of the working end of the drill.

Figure 3, an elevation of the shank end of the drill on line 3—3 of Figure 1.

Figure 4, an elevation showing the grooved side of the drill.

Figure 5, a sectional view of the shank on line 5—5 of Figure 1.

Referring to the drawings, Figure 1 shows a drill head 10 and a drill shank 12 brazed together at 14. The drill head 10 has an ensmalled end 16 which is inserted into the end of the shank 12. The drill shank 12 is preferably enlarged or expanded at the head end to receive the ensmalled end 16 which has coolant grooves 18 and 20 as well as recesses 22 and 24 for wear strips 26 and 28 of carbide, high-speed steel or similar hard material spaced around the drill head. The drill head and the shank are each provided with a segmental slot 30 which extends from one end to the other of the drill combination. This segmental slot covers substantially more than 90°, and at one wall thereof there is mounted a wear insert 32 which has at its outer edge the cutting edge 34 and at its lower end the cutting surfaces 36. These wear inserts may be brazed in place.

The interior of the shank 12, which is formed as a collapsed tube, has a half-moon type opening 38 which carries coolant down to the drill head, where it enters the grooves 18 and 20 in the outer face of the drill head. These grooves slope gradually outwardly to the surfaces 40 and 42. The surface 40 lies between the two ribs 26 and 28, and the surface 42 lies between the rib 28 and the insert 32.

In the assembly of the device, I have found it advantageous to expand the end of the shank 12 and then insert the ensmalled end 16, brazing it in place. Subsequently, the end of the shank 12 adjacent the head is ground in size, and it will be slightly larger in dimension than the remainder of the shank (Figure 4) and have a relatively snug fit with the hole which is drilled.

With this method of assembly, I have found that the joint between the head and the shank is extremely strong and that the gun drill as a whole can be made cheaper than those of previous construction. This also provides an extremely solid drive between the head and the shank which will reinforce the braze or weld. In fact, the drill can be operated without a braze or weld.

In the operation of the drill, I have discovered that when the entire head end of the drill is embedded in a work piece there is a free flow of coolant to the drill end and out of the segmental slot. No high pressures are needed to introduce the affluent coolant, and there is a good chip flow in the effluent out of the segmental slot.

I have also discovered that in the drilling the fluid introduced at the outsides of the head end of the drill serves as a film bearing, permitting easy rotation of the drill in the hole, and also provides a re-action pressure to the re-action force of the drilling edges of the head end.

Another surprising result that I have observed in the use of my drill is that when the drill is entering the work even in the absence of a guide bushing, fluid introduced into the center of the shank will pass out of the holes 18 and 20 and move down the surfaces 40 and 42 in a manner that shows no tendency for the liquid to move away from the drill. It clings to the drill head, passes down into the hole, and emits from the segmental opening 30 with considerable force, thus insuring a coolant and lubricating action even when the drill is starting a hole and despite the fact that the openings 18 and 20 are spaced away from the end of the drill. When a drill guide bushing is used, of course, this action is increased so that there is no problem in starting a drill of the construction described.

The construction referred to adapts itself to the making of gun drills in all sizes and is particularly useful in making drills of small sizes, which has been difficult in the pass. In this type of drill, the outlet area is larger than the inlet area so that no unusual pressure apart from that available in the ordinary water tap is required to force in the coolant. Furthermore, due to the quantity of coolant which may be passed through the drill, it is unnecessary to refrigerate the coolant in order to maintain the proper drilling temperature.

It will be noted that there are no drilled holes in the head end of the drill, all fluid passing through surface grooves 18 and 20 from the relative large interior opening of the collapsed shank 12. Thus, in small drills, such as ¼" diameter, there is no problem of making tiny holes in the shank of the head since the release openings 18 and 20 can be readily formed in a manner to strengthen the assembly instead of weakening it.

I claim:

1. A gun drill for deep hole drilling, which comprises, on the one hand a collapsed tube shank having a lineally extending segmental groove, the interior of the shank having a passage shaped in the form of a half-moon, said gun drill comprising on the other hand a head end formed of solid material also having a segmental groove extending throughout its length, one end of said head end being ensmalled and shaped to conform generally to the half-moon opening of the shank end to be received in one end of said shank, said ensmalled end having surface grooves extending into the head and beyond the ensmalled portion thereof shallowing gradually from the small end to the surface of the head end and the other end of the head end opposite the ensmalled end being shaped to provide cutting edges for the drill.

2. A device as defined in claim 1 in which two or more recesses are provided in the outer surface of the head end of the drill extending longitudinally thereof, spaced from the surface grooves extending from the ensmalled end, and wear strips in each of said recesses forming ribs projecting from the outer surface of the head end of the drill to form wide grooves connecting to said surface grooves leading to the interior of the shank.

3. A gun drill for deep hole drilling, which comprises on the one hand a collapsed tube shank having a lineally extending segmental groove, the interior of the shank having a passage shaped substantially in the form of a half moon, said gun drill comprising on the other hand a head end formed of solid material also having a segmental groove extending throughout its length on one side thereof, the general diameter of the head end being substantially the same as that of the collapsed tube shank, said tube shank being enlarged at one end, one end of said head end being ensmalled and shaped to conform generally to the half moon opening of the enlarged shank and to be received in said enlarged end of said shank, said ensmalled end having surface grooves extending into the head end beyond the ensmalled portion thereof shallowing gradually from the small end to the surface of the head end and the other end of the head opposite the ensmalled end being shaped to provide cutting edges for the drill, and means on the outer surface of the head end extending axially thereof and projecting from the surface of the head end to a point approximating the diameter of the enlarged end of the collapsed tube shank and spaced circumferentially to provide wide surface grooves on said head and below said shank extending to the tip of the head end and opening to the surface grooves formed in the ensmalled end of said head whereby coolant within said shank will flow down through said surface grooves in a widening stream clinging to the surface of the head end as it reaches the drilling point thereof.

4. A gun drill for deep-hole drilling, which comprises, on the one hand a collapsed tube shank having a lineally extending segmental groove, the interior of the shank having a passage axially thereof, said gun drill comprising on the other hand a head end formed of solid material also having a segmental groove extending throughout its length, one end of said head end being ensmalled and shaped to conform generally to the axial opening of the shank and received in one end of said shank, said ensmalled end having one or more surface grooves extending axially thereof from the ensmalled end of the portion within and connecting to the axial passage of the shank at one end and extending outward at the other end beyond the ensmalled portion thereof shallowing gradually from the small end to the surface of the head end, the other end of the head end opposite the ensmalled end being shaped to provide cutting edges for the drill.

5. A device as defined in claim 4 in which the head end of the drill outside the shank is shaped with relatively wide surface grooves extending axially to the cutting end of the drill and connected to said surface grooves of the ensmalled end, the shank end of said wide surface grooves terminating at the end walls of said shank.

References Cited in the file of this patent
UNITED STATES PATENTS

| 1,304,981 | Hoagland | May 27, 1919 |
| 2,606,464 | Fleischer | Aug. 12, 1952 |